F. SMITH.
SHOCK PREVENTER FOR VEHICLES AND THE LIKE.
APPLICATION FILED JAN. 22, 1915.

1,196,166.

Patented Aug. 29, 1916.
2 SHEETS—SHEET 1.

WITNESSES:

INVENTOR
Fred Smith
BY
ATTORNEY

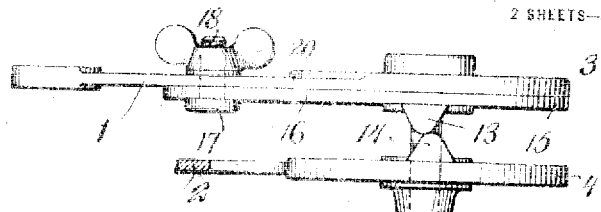
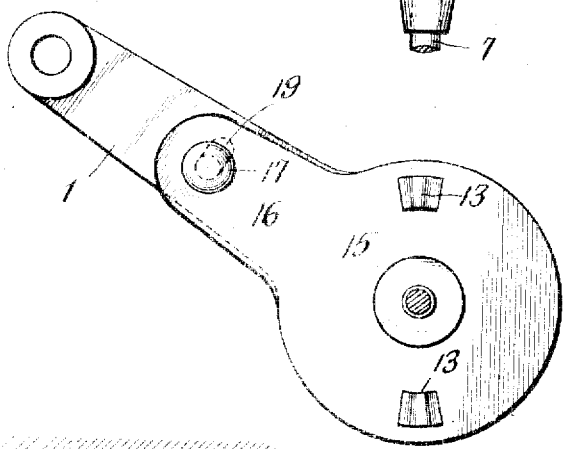
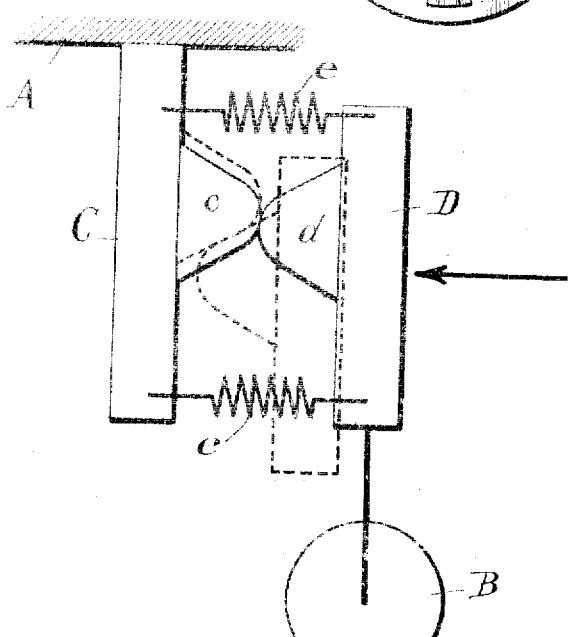

UNITED STATES PATENT OFFICE.

FRED SMITH, OF SPRINGDALE, CONNECTICUT.

SHOCK-PREVENTER FOR VEHICLES AND THE LIKE.

1,196,166.  Specification of Letters Patent.  Patented Aug. 29, 1916.

Application filed January 27, 1915. Serial No. 4,601.

*To all whom it may concern:*

Be it known that I, FRED SMITH, a citizen of the United States, residing at Springdale, in the county of Fairfield and State of Connecticut, have invented certain new and useful Improvements in Shock-Preventers for Vehicles and the like, of which the following is a specification.

My invention relates to shock preventers or absorbers which are so arranged between the body and wheels of a vehicle as to freely permit movement of the wheels toward or away from the body, in response to abrupt changes in the road surface, while tending to maintain the body at the level it occupied before the ascent or descent of the wheels, until the return of the latter to their normal position in relation to the body.

Under my conception, when the wheels drop into a hollow or depression, not only should the body not be dragged down with them, but it should, in practical effect, be supported in its original plane. Indeed, in one form of apparatus by which such conception may be carried into practical effect, the wheels are virtually aided in their descent into the depression, this being an incident of the operation of maintaining the body at approximately its level prior to such descent.

One form in which the invention may be employed to carry out the principle involved herein is illustrated in the accompanying drawings in which—

Figure 1:
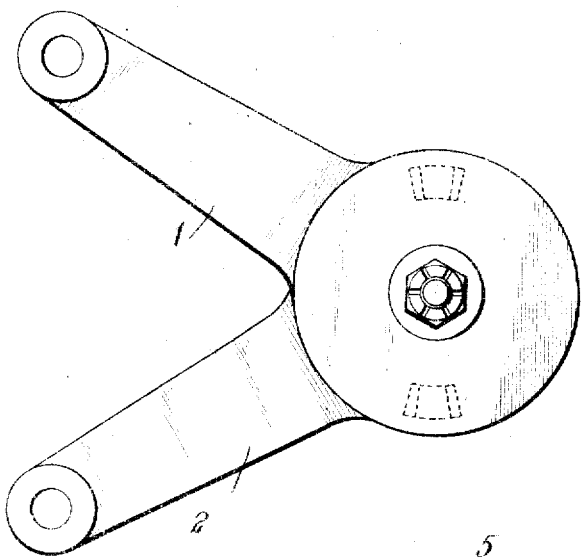
Figure 2:
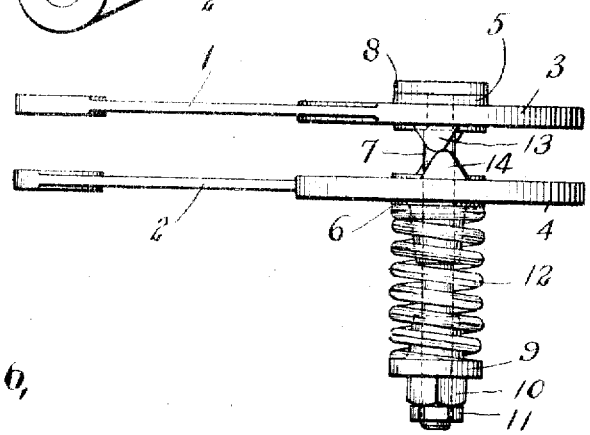
Figure 6:
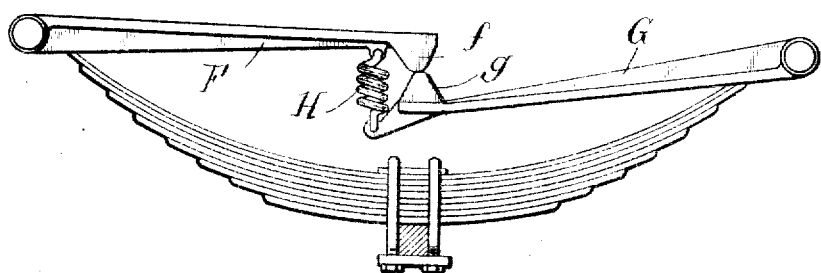

Figure 1 is a side elevation and Fig. 2 a plan view of a shock preventer adapted for application to a motor vehicle, Fig. 3 is a plan view, and Fig. 4 an elevation of such a device provided, however, with means of adjustment to be later referred to, and Figs. 5 and 6 are views, largely diagrammatic, illustrating the theory of operation of my device.

Referring first to Fig. 5, the vehicle body is indicated at A and the wheels at B. An arm C is rigidly connected to, and moves with, the body, while a similar arm D is rigidly connected to, and moves with, the wheels. These arms carry wedge-shaped shoulders *c, d* normally directly opposite each other, their apices being in contact. By suitable means such, for example, as springs *e*, the arms C, D are drawn strongly toward each other, thereby keeping the shoulders *c, d* always in intimate contact, regardless of their position, in a horizontal plane relatively to each other. In this diagrammatic view, the vehicle is supposed to be progressing in the direction indicated by the adjacent arrow. When the wheels drop into the depression indicated in the figure, there is, of course, relative movement, both vertically and horizontally, of the wedge-shaped shoulders *c, d* under the influence of the springs, or other medium, tending to draw the supports therefor toward each other. The apex of the shoulder *d* rides past the corresponding apex of the shoulder *c* and the upper surface thereof rides along the lower surface of the shoulder *c*. This movement is strongly accelerated by the springs, or other corresponding medium, with the result that the movement of the wheels B instead of being reproduced in similar movement of the body A is not so reproduced, but, on the contrary, upward-lifting pressure is applied to the body tending to maintain it in equilibrium despite the downward movement of the wheels. Such downward movement of the wheels is in this instance even accelerated by the coaction of the wedge-shaped shoulders *c, d* under the influence of the springs *e* or other medium.

Another application of the same principle is illustrated in Fig. 6 in connection with the semi-elliptical spring of a motor vehicle to the ends of which are pivotally secured two arms F, G, the former bearing at its end a wedge-shaped shoulder *f* and the latter bearing at its end a wedge-shaped shoulder *g*, these shoulders and the arms upon which they are here shown as formed being spring pressed toward each other by suitable means such as a spring H. Obviously, movement of the body and chassis relatively to each other involves corresponding movement of the spring (and therefore of the ends thereof), movement of the body toward the chassis tending to flatten the spring and therefore to increase the distance between its ends, while movement of the body away from the chassis tends to accentuate the curvature of the spring and therefore to decrease the distance between its ends. In this instance, the coaction of the wedge-shaped shoulders *f, g*, under the influence of the spring H, or other corresponding medium, is essentially the same as that of the wedge-shaped shoulders *c, d* in Fig. 5, under the same influence and conditions above described.

Turning now to the description of a commercial form in which the principle thus explained may be employed, 1, 2 represent two arms having enlarged heads 3, 4, the ends distant therefrom being suitably perforated for coaction with shackles or other devices whereby the arm 1 may be pivotally secured to the vehicle body and the arm 2 to the chassis. The enlarged head 3 of the member 1 is provided with a central boss 5, and the enlarged head 4 of the member 2 with a similar boss 6, these bosses being perforated to receive a stub-shaft 7 having head 8 outside the part 3, the other end of said stub-shaft being here shown as provided with a washer 9 and nut and jam-nut 10 and 11. Interposed between the washer 9 and the outer face of the enlarged head 4 of the member 2 is a strong coiled spring 12 under tension and therefore tending strongly to press the heads 3, 4 together. In this embodiment of the invention, each of the heads is shown as provided upon its inner face with two wedge-shaped shoulders such as those heretofore described, the shoulders 13 being secured upon the inner face of the head 3, equally distant from the center of said head and the shoulders 14 being secured upon the inner face of the head 4, and equally distant from the center thereof. These shoulders are so arranged that when the arms 1, 2 are in their normal and usual position (representing therefore the normal and usual position of the body of the vehicle relatively to the chassis), the apices of the shoulders will be in contact and in position to be readily moved relatively to each other in manner hereinbefore described. The precise form of the coacting surfaces of such shoulders is not of importance except in so far, in the present example, as involves the requirement that they be of greater dimension at their bases than at their apices. Such apices may be sharp and pointed, or as indicated in the drawings, slightly rounded. The latter form may be preferred both for smoothness of operation and in view of variations in the load carrier by the vehicle body.

In Figs. 3 and 4 I have shown the wedge-shaped shoulders 13 as mounted, not directly upon the enlarged head 3 of the arm 1, but upon the enlarged head 15 of an auxiliary arm 16 mounted, like the enlarged head 3, upon the stub-shaft 7 and in contact with the head 3. This auxiliary arm, and its head 15, are made adjustable relatively to the arm 1 and its head 3 in any suitable manner. For example, the outer end thereof may be perforated to receive a stud 17, the threaded shank of which 18 protrudes through a slot 19 in the arm 1, its end receiving a wing-nut 20, whereby the arm 1 and auxiliary arm 16 may be clamped immovably together. The advantage of such means of adjustment is that less care need be exercised in securing the ends of the arms 1, 2 to the body and chassis, respectively, for after the arms have been so secured, the auxiliary arm 16 may be so adjusted in view of the normal position of the body relatively to the chassis that the opposing shoulders 13 and 14 shall be directly opposite each other, with their apices in contact, the shoulders being ready to move relatively to each other in correspondence with movement of the body and chassis as heretofore described.

As will readily be understood, the mode of operation of this commercial form of the device is that heretofore explained in connection with the description of Figs. 5 and 6. As the wedge-shaped shoulders are moved relatively to each other, such movement taking place under the influence of the spring, or other medium by means of which said shoulders and the parts by which they are carried are strongly pressed together, such movement is utilized, in manner above indicated, to maintain the equilibrium of the body, regardless of movement of the wheels or the chassis relatively thereto. When, for example, the wheels drop into a depression simultaneously, such movement of the wheels is accelerated, but as an incident of the acceleration corresponding movement of the body is opposed and the degree of such acceleration and opposition may be varied within wide limits by increasing or decreasing the tension of the spring 12, or such other device (as for example an elastic block) as may be employed for the same purpose. It will also be understood that the same effect (that of maintaining the equilibrium of the body) is accomplished by the construction described whether the wheels encounter a depression or an elevation. In the latter case, it is the upward movement of the wheels which is accelerated, but as an incident of such acceleration, the body, instead of being permitted or forced to correspondingly rise, is, by means of the coaction of the wedge-shaped shoulders, restrained from so doing. Moreover, regardless of the direction in which, due to the movement of the wheels, there is a tendency of the body to move, the restrain upon such movement is gradually and increasingly applied, the possibility of shock or jar being thereby correspondingly diminished.

In describing herein the construction illustrated in Figs. 1 to 4 of the drawings, I desire to make it plain that the invention is not limited thereto, such construction being merely a single commercial form in which the invention may be effectively employed.

Having now described my invention, what I claim as new therein and desire to secure by Letters Patent is as follows:

1. In a shock preventer, the combination of two arms adapted to be connected at one end of each respectively with the body and wheels of a vehicle, the other ends of the arms being provided with enlarged heads, a stub-shaft on which said heads are pivotally mounted, a plurality of wedge-shaped members on the inner faces of each of said heads, members on opposing faces being similarly spaced about the axis of said heads, with opposing members equidistant from the said axis and with the rounded apices of opposing members normally in contact, and resilient means for forcing said heads toward each other, substantially as set forth.

2. In a shock preventer, the combination of two arms adapted to be connected at one end of each respectively with the body and wheels of a vehicle, the other ends of the arms being provided with enlarged heads, a stub-shaft on which said heads are pivotally mounted, a plate on the inner side of one of said heads, pivoted on said stub-shaft, wedge-shaped members on the opposing faces of said plate and the second of said heads, equi-distant from the axis of said plate and heads, and normally contacting at their apices, adjustable devices for securing said plate to the first of said two arms in adjusted angular position, so that said wedge-shaped members will contact normally with each other at their apices, and resilient means for forcing the first head and plate and second head toward each other, substantially as set forth.

3. In a shock preventer, the combination with two arms pivotally connected at their ends respectively with the body and wheels of a vehicle, their other ends being provided with enlarged heads, of a wedge-shaped member on the inner side of one of said heads, a wedge-shaped member on the inner side of the other of said heads, said heads being pivotally connected and said wedge-shaped members being normally in contact at their apices, means for adjusting the angular position of the wedge-shaped member on one of said heads relatively to the corresponding member on the other head to insure normal contact of said members at their apices, and mechanism for holding said wedge-shaped members in contact under pressure, substantially as described.

This specification signed and witnessed this 20th day of January, 1915.

FRED SMITH.

Witnesses:
BERTHA B. LORD,
HELEN M. NORTHROP.

wheels of a vehicle, the other ends of the arms being provided with enlarged heads, a stub-shaft on which said heads are pivotally mounted, a plurality of wedge-shaped members on the inner faces of each of said heads, members on opposing faces being similarly spaced about the axis of said heads, with opposing members equidistant from the said axis and with the rounded apices of opposing members normally in contact, and resilient means for forcing said heads toward each other, substantially as set forth.

2. In a shock preventer, the combination of two arms adapted to be connected at one end of each respectively with the body and wheels of a vehicle, the other ends of the arms being provided with enlarged heads, a stub-shaft on which said heads are pivotally mounted, a plate on the inner side of one of said heads, pivoted on said stub-shaft, wedge-shaped members on the opposing faces of said plate and the second of said heads, equi-distant from the axis of said plate and heads, and normally contacting at their apices, adjustable devices for securing said plate to the first of said two arms in adjusted angular position, so that said wedge-shaped members will contact normally with each other at their apices, and resilient means for forcing the first head and plate and second head toward each other, substantially as set forth.

3. In a shock preventer, the combination with two arms pivotally connected at their ends respectively with the body and wheels of a vehicle, their other ends being provided with enlarged heads, of a wedge-shaped member on the inner side of one of said heads, a wedge-shaped member on the inner side of the other of said heads, said heads being pivotally connected and said wedge-shaped members being normally in contact at their apices, means for adjusting the angular position of the wedge-shaped member on one of said heads relatively to the corresponding member on the other head to insure normal contact of said members at their apices, and mechanism for holding said wedge-shaped members in contact under pressure, substantially as described.

This specification signed and witnessed this 20th day of January, 1915.

FRED SMITH.

Witnesses:
BERTHA B. LORD,
HELEN M. NORTHROP.

---

Corrections in Letters Patent No. 1,196,166.

It is hereby certified that in Letters Patent No. 1,196,166, granted August 29, 1916, upon the application of Fred Smith, of Springdale, Connecticut, for an improvement in "Shock-Preventers for Vehicles and the Like," errors appear in the printed specification requiring correction as follows: Page 2, line 48, for the word "carrier" read *carried;* same page, line 115, for the word "restrain" read *restraint;* and that the said Letters Patent should be read with these corrections therein that the same may conform to the record of the case in the Patent Office.

Signed and sealed this 24th day of October, A. D., 1916.

[SEAL.]

F. W. H. CLAY,
*Acting Commissioner of Patents.*

It is hereby certified that in Letters Patent No. 1,196,166, granted August 29, 1916, upon the application of Fred Smith, of Springdale, Connecticut, for an improvement in "Shock-Preventers for Vehicles and the Like," errors appear in the printed specification requiring correction as follows: Page 2, line 48, for the word "carrier" read *carried;* same page, line 115, for the word "restrain" read *restraint;* and that the said Letters Patent should be read with these corrections therein that the same may conform to the record of the case in the Patent Office.

Signed and sealed this 24th day of October, A. D., 1916.

[SEAL.]
F. W. H. CLAY,
*Acting Commissioner of Patents.*